(12) United States Patent
Newhouse et al.

(10) Patent No.: US 8,660,784 B2
(45) Date of Patent: Feb. 25, 2014

(54) METHODS AND SYSTEMS FOR DETERMINING DRIVER EFFICIENCY IN A VEHICLE

(75) Inventors: Vernon L. Newhouse, Farmington, MI (US); Carlene M. Sienkiewicz, Brighton, MI (US); Emily R. Wu, New Hudson, MI (US); Kevin S. Kidston, New Hudson, MI (US); Jonathan R. Schwarz, Clawson, MI (US); Don St John, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1873 days.

(21) Appl. No.: 11/852,850

(22) Filed: Sep. 10, 2007

(65) Prior Publication Data

US 2009/0070027 A1 Mar. 12, 2009

(51) Int. Cl.
G06G 7/70 (2006.01)
G06F 19/00 (2011.01)

(52) U.S. Cl.
USPC .......................................... 701/123; 340/439

(58) Field of Classification Search
USPC ............................ 701/123; 340/439; 702/182
See application file for complete search history.

(56) References Cited

U.S. PATENT DOCUMENTS

| | | | |
|---|---|---|---|
| 4,293,844 A * | 10/1981 | Ruhl | 340/439 |
| 5,693,876 A | 12/1997 | Ghitea, Jr. et al. | |
| 5,758,299 A * | 5/1998 | Sandborg et al. | 701/29 |
| 6,092,021 A * | 7/2000 | Ehlbeck et al. | 701/123 |
| 6,201,312 B1 | 3/2001 | Shioiri et al. | |
| 6,411,888 B1 * | 6/2002 | Weisman, II | 701/115 |
| 6,480,106 B1 | 11/2002 | Crombez et al. | |
| 7,206,689 B1 * | 4/2007 | Johnson | 701/103 |
| 7,769,499 B2 * | 8/2010 | McQuade et al. | 701/1 |
| 2002/0171541 A1 | 11/2002 | Crombez et al. | |
| 2005/0209771 A1 * | 9/2005 | Ishiguro | 701/123 |
| 2006/0166783 A1 | 7/2006 | Tamai et al. | |
| 2007/0027593 A1 * | 2/2007 | Shah et al. | 701/30 |
| 2007/0143002 A1 * | 6/2007 | Crowell et al. | 701/123 |
| 2007/0256481 A1 * | 11/2007 | Nishiyama et al. | 73/113 |
| 2008/0120175 A1 * | 5/2008 | Doering | 705/14 |
| 2009/0043467 A1 | 2/2009 | Filev et al. | |

FOREIGN PATENT DOCUMENTS

| | | | | |
|---|---|---|---|---|
| JP | 11220807 A | 8/1999 | | |
| JP | 2007125921 A | 5/2007 | | |
| WO | WO-2006/018944 A1 * | 2/2006 | | F02D 45/00 |

OTHER PUBLICATIONS

U.S. Final Office Action for U.S. Appl. No. 11/852,879 mailed Apr. 15, 2011.
Notice of Allowance, dated Sep. 2, 2011, for U.S. Appl. No. 11/852,879.

* cited by examiner

*Primary Examiner* — John Q Nguyen
*Assistant Examiner* — Brian J Broadhead
(74) *Attorney, Agent, or Firm* — Ingrassia Fisher & Lorenz, P.C.

(57) ABSTRACT

A method for determining driver efficiency in a vehicle includes the steps of measuring a vehicle parameter, and calculating the driver efficiency based, at least in part, on the vehicle parameter. The vehicle parameter is influenced, at least in part, by an action taken by a driver.

18 Claims, 7 Drawing Sheets

METHODS AND SYSTEMS FOR DETERMINING DRIVER EFFICIENCY IN A VEHICLE

TECHNICAL FIELD

The present invention generally relates to the field of vehicles and, more specifically, to methods and systems for determining driver efficiency in a vehicle.

BACKGROUND OF THE INVENTION

Many of today's vehicles have one or more features to promote fuel efficiency. For example, many vehicles have overdrive or cruise control features and/or are configured to run on electrical power and/or other alternative power sources. In addition, the actions of a driver of a vehicle can also play a significant role in fuel efficiency. For example, if the driver operates the vehicle so that the vehicle's speed or acceleration exceeds a desired range, or if the driver causes the vehicle to change speeds at large magnitudes very quickly, this can have an adverse effect on the fuel efficiency of the vehicle. However, it may be difficult for the driver to ascertain whether he or she is driving the vehicle in an efficient manner. This may be particularly difficult while the driver is operating the vehicle.

Accordingly, it is desirable to provide methods to determine driver efficiency in a vehicle. It is also desirable to provide systems to determine driver efficiency in a vehicle. It is further desirable to provide methods and systems to determine driver efficiency in a vehicle while a driver is operating the vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for determining driver efficiency in a vehicle is provided. The method comprises the steps of measuring a vehicle parameter, and calculating the driver efficiency based, at least in part, on the plurality of vehicle parameter. The vehicle parameter is influenced, at least in part, by an action taken by a driver.

In accordance with another exemplary embodiment of the present invention, a display device for a vehicle is provided. The display device comprises an input device and a display. The input device is configured to receive driver efficiency. The driver efficiency comprises a measure of an impact of an action taken by a driver of the vehicle on a fuel efficiency of the vehicle. The display is coupled to the input device, and comprises a gauge. The gauge is configured to move between a plurality of positions based, at least in part, on the driver efficiency.

In accordance with a further exemplary embodiment of the present invention, a system for displaying driver efficiency for a vehicle is provided. The system comprises a sensing unit, a processor, and a display device. The sensing unit is configured to at least facilitate measuring a vehicle parameter. The vehicle parameter is influenced, at least in part, by an action taken by a driver. The processor is coupled to the sensing unit, and is configured to at least facilitate calculating the driver efficiency based, at least in part, on the vehicle parameter. The display device is coupled to the processor, and comprises an input device and a display. The input device is coupled to the processor, and is configured to receive the driver efficiency therefrom. The display is coupled to the input device, and comprises a gauge. The gauge is configured to move between a plurality of positions based, at least in part, on the driver efficiency.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
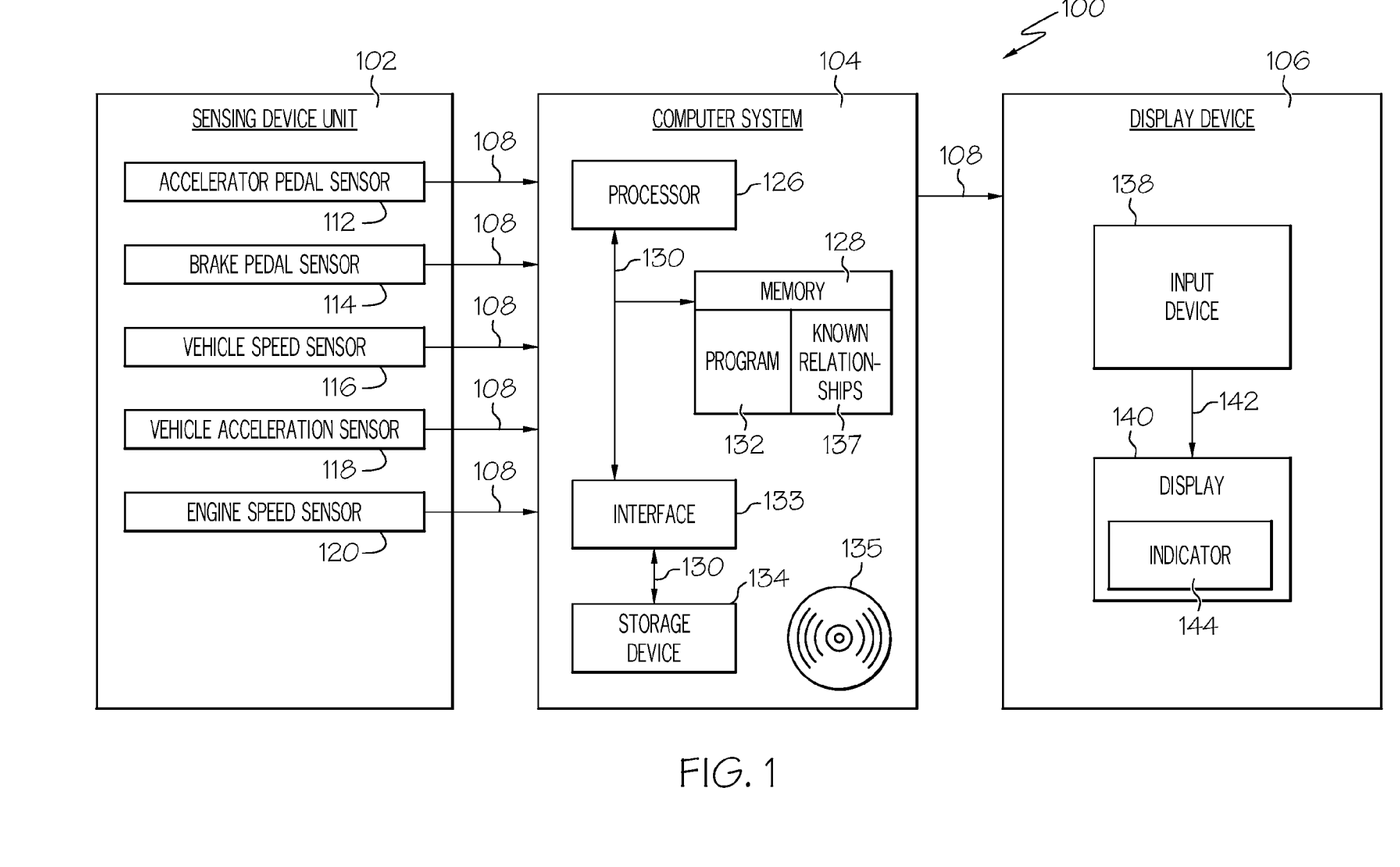
FIG. 1 is a functional block diagram showing a system for determining a driver efficiency value in a vehicle, in accordance with an exemplary embodiment of the present invention.

FIG. 1 is a functional block diagram showing a system 100 for determining and displaying a driver efficiency value in a vehicle, in accordance with an exemplary embodiment of the present invention. In the depicted embodiment, the system 100 includes a sensing device unit 102, a computer system 104, and a display system 106.

The sensing device unit 102 includes various sensors for measuring a plurality of vehicle parameters, for subsequent use by the computer system 104 in determining a driver efficiency value in the vehicle. Each of the vehicle parameters are influenced, at least in part, by an action of the driver, such as the driver's application of pressure against an accelerator pedal and/or a brake pedal of the vehicle. In the depicted embodiment, the sensing device unit 102 includes an accelerator pedal sensor 112, a brake pedal sensor 114, a vehicle speed sensor 116, a vehicle acceleration sensor 118, and an engine speed sensor 120. In other embodiments, the sensing device unit 102 may include a different combination of these and/or other different types of sensors or similar devices.

The accelerator pedal sensor 112 senses if the driver is applying force to the accelerator pedal, for example by sensing when a driver's foot is in contact with the accelerator pedal. Additionally, the accelerator pedal sensor 112 senses changes in accelerator pedal position and/or force applied thereto. For example, the accelerator pedal sensor 112 measures changes in the accelerator pedal position and/or force applied against the accelerator pedal through driver actions, to at least facilitate a determination of a driver efficiency value, as set forth further below. Specifically, in the depicted embodiment, values sensed by the accelerator pedal sensor 112 are provided, via the vehicle bus 108, to the computer system 104 for processing. The accelerator pedal sensor 112 may include one or more sensors or similar devices, preferably coupled to the accelerator pedal of the vehicle.

The brake pedal sensor 114 senses if the driver is applying force to the brake pedal, for example by sensing when a driver's foot is in contact with the brake pedal. Additionally, the brake pedal sensor 114 senses changes in brake pedal position and/or force applied against the brake pedal based on driver actions, to at least facilitate a determination of a driver efficiency value as set forth further below. In one embodiment, the brake pedal sensor 114 senses braking pressure against the brake pedal, and includes one or more pedal travel sensors, pedal force sensors, and/or other sensors. For example, one or more pedal travel sensors may provide an indication of how far the brake pedal has traveled, which is also known as brake pedal travel, when the driver applies force to the brake pedal. In one exemplary embodiment, such brake pedal travel can be determined by how far a brake master cylinder input rod coupled to the brake pedal has moved. As another example, one or more brake pedal force sensors may determine how much force the driver is applying to the brake pedal. This is also known as brake pedal force. In one exemplary embodiment, such a brake pedal force sensor may include a hydraulic pressure emulator and/or a pressure transducer, and the brake pedal force can be determined by measuring hydraulic pressure in a master cylinder of a braking system.

Additionally, the brake pedal sensor 114 may, in concert with the accelerator pedal sensor 112, facilitate measurement of changes in the driver's application of the brake pedal and/or the accelerator pedal. For example, such changes may occur when the driver exerts significant pressure against the brake pedal and then the accelerator pedal, or vice versa, or both, or when the driver rapidly changes pressure against the accelerator pedal and/or the brake pedal. Such changes, or measures reflecting similar driver actions, can reflect less than optimal driver efficiency by the driver of the vehicle. In the depicted embodiment, values sensed by the brake pedal sensor 114 are provided, via the vehicle bus 108, to the computer system 104 for processing. The brake pedal sensor 114 may include one or more sensors or similar devices, preferably coupled to the brake pedal of the vehicle.

The vehicle speed sensor 116 measures a speed of the vehicle, for example as influenced, at least in part, by the driver's application of the accelerator pedal and/or the brake pedal. As described in greater detail further below, such vehicle speed values can be used in multiple ways to at least facilitate a determination of a driver efficiency value. In the depicted embodiment, values sensed by the vehicle speed sensor 116 are provided, via the vehicle bus 108, to the computer system 104 for processing. The vehicle speed sensor 116 may include one or more sensors or similar devices, for example coupled to one or more wheels of the vehicle or disposed inside the vehicle.

The vehicle acceleration sensor 118 measures an acceleration of the vehicle, for example as influenced, at least in part, by the driver's application of the accelerator pedal and/or the brake pedal. As described in greater detail further below, such vehicle acceleration values can be used to at least facilitate a determination of a driver efficiency value, for example when used to calculate a combined effect of vehicle speed and vehicle acceleration on the fuel efficiency of the vehicle. In the depicted embodiment, values sensed by the vehicle acceleration sensor 118 are similarly provided, via the vehicle bus 108, to the computer system 104 for processing. The vehicle acceleration sensor 118 may include one or more sensors or similar devices, for example accelerometers inside the vehicle.

The engine speed sensor 120 measures a speed of an engine of the vehicle, for example as influenced, at least in part, by the driver's application of the accelerator pedal and/or the brake pedal. As described in greater detail further below, such engine speed values can be used to at least facilitate a determination of a driver efficiency value. In the depicted embodiment, values sensed by the engine speed sensor 120 are provided, via the vehicle bus 108, to the computer system 104 for processing. The engine speed sensor 120 may include one or more sensors or similar devices, preferably coupled to an engine of the vehicle.

The computer system 104 is coupled to the sensing device unit 102. The computer system 104 receives data via the vehicle bus 108 from the various sensors of the sensing device unit 102. As described in more detail below, the computer system 104 uses values from the sensing device unit 102 to perform various calculations, comparisons, and determinations, such as those described further below in connection with FIG. 3, for example in determining a driver efficiency value in the vehicle. The computer system 104 uses such calculations, comparisons, and determinations in ultimately determining the driver efficiency value, and provides the driver efficiency value to the display system 106, in which the driver efficiency value is displayed in some format for the driver.

In the depicted embodiment, the computer system 104 includes a processor 126, a memory 128, a computer system bus 130, an interface 133, and a storage device 134. The processor 126 performs the computation and control functions of the computer system 104, and may comprise any type of processor or multiple processors, single integrated circuits such as a microprocessor, or any suitable number of integrated circuit devices and/or circuit boards working in cooperation to accomplish the functions of a processing unit. During operation, the processor 126 executes one or more programs 132 preferably stored within the memory 128 and, as such, controls the general operation of the computer system 104.

In one embodiment, the memory 128 stores a program or programs 132 that executes one or more embodiments of a driver efficiency determination process of the present invention, discussed in more detail below. The memory 128 can be any type of suitable memory. In addition, in a preferred embodiment, the memory 128 stores various tables, charts, functions, or other forms of known relationships 137 between the vehicle parameters and fuel efficiency of the vehicle, to assist in the determination of a driver efficiency value in the vehicle. The memory may include one or more of various types of dynamic random access memory (DRAM) such as SDRAM, the various types of static RAM (SRAM), and the various types of non-volatile memory (PROM, EPROM, and flash). It should be understood that the memory 128 may be a single type of memory component, or it may be composed of many different types of memory components. In addition, the memory 128 and the processor 126 may be distributed across several different computers that collectively comprise the computer system 104. For example, a portion of the memory 128 may reside on a computer within a particular apparatus or process, and another portion may reside on a remote computer.

The computer system bus 130 serves to transmit programs, data, status and other information or signals between the various components of the computer system 104. The computer system bus 130 can be any suitable physical or logical means of connecting computer systems and components. This includes, but is not limited to, direct hard-wired connections, fiber optics, infrared and wireless bus technologies.

The interface 133 allows communication to the computer system 104, for example from a system driver and/or another computer system, and can be implemented using any suitable method and apparatus. It can include one or more network interfaces to communicate with other systems or components, for example the sensing device unit 102 and the various sensors thereof, and/or the display system 106 and the input device 138 thereof, for example via the vehicle bus 108. The interface 133 may also include one or more network interfaces to communicate with technicians, and/or one or more storage interfaces to connect to storage apparatuses, such as the storage device 134.

The storage device 134 can be any suitable type of storage apparatus, including direct access storage devices such as hard disk drives, flash systems, floppy disk drives and optical disk drives. In one exemplary embodiment, the storage device 134 is a program product from which memory 128 can receive a program 132 that executes one or more embodiments of a driver efficiency determination process of the present invention. As shown in FIG. 1, the storage device 134 can comprise a disk drive device that uses disks 135 to store data. As one exemplary implementation, the computer system 104 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 135), and transmission media such as digital and analog communication links. It will similarly be appreciated that the computer system 104 may also otherwise differ from the embodiment depicted in FIG. 1, for example in that the computer system 104 may be coupled to or may otherwise utilize one or more remote computer systems and/or other control systems.

The display system 106 is coupled to the processor 126 of the computer system 104. The display system 106 receives the driver efficiency value therefrom via the vehicle bus 108, and displays the driver efficiency value for the driver, preferably while the driver is operating the vehicle. As depicted in FIG. 1, the display system 106 includes an input device 138 and a display 140. The input device 138 is coupled to the processor 126 of the computer system 104, and is configured to receive the driver efficiency value therefrom. The display 140 is coupled to the input device 138, and receives data representative of the driver efficiency value therefrom, for example via a connection 142. The display 140 includes a gauge 144 that is configured to move between a plurality of positions based, at least in part, on the driver efficiency value, as described in greater detail below in connection with FIG. 2. As shown in FIG. 1, in certain embodiments other indicators may also be used.

Figure 2:
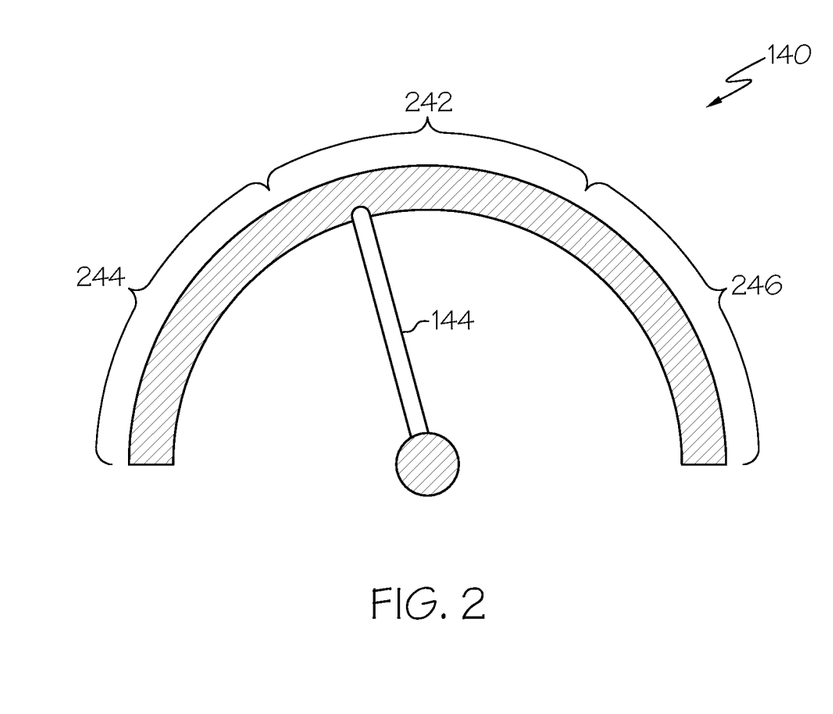
FIG. 2 is a front view of a display for displaying a value of driver efficiency in a vehicle, and that can be used in connection with the system of FIG. 1, in accordance with an exemplary embodiment of the present invention.

FIG. 2 is a front view of the display 140 in accordance with an exemplary embodiment of the present invention. As depicted in FIG. 2, in a preferred embodiment the display 140 comprises a gauge 144 that is movable within and between a first range 242, a second range 244, and a third range 246 of positions, depending on the driver efficiency value.

The gauge 144 moves within the first range 242 of positions when the driver efficiency value is within a range of values that are considered to represent efficient driving. The gauge 144 is depicted as being within the first range 242 in FIG. 2. The gauge 144 moves to the left within this first range 242 as the driving becomes even more efficient within this range. Conversely, the gauge 144 moves to the right within this first range 242 as the driving becomes somewhat less efficient within this range.

The gauge 144 moves within the second range 244 of positions when both of the following conditions are satisfied; namely: the driver efficiency value is within a range of values that are considered to represent inefficient driving, and the vehicle is decelerating. The gauge 144 moves to the left within this second range 244 as the driving becomes more efficient within this range. Conversely, the gauge 144 moves to the right within this second range 244 as the driving becomes less efficient within this range.

The gauge 144 moves within the third range 246 of positions when both of the following conditions are satisfied; namely: the driver efficiency value is within a range of values that are considered to represent inefficient driving, and the vehicle is accelerating. The gauge 144 moves to the left within this third range 246 as the driving becomes more efficient within this range. Conversely, the gauge 144 moves to the right within this third range 246 as the driving becomes less efficient within this range.

Accordingly, the display 140 provides the driver with information as to how efficient he or she is operating the vehicle, while the driver is operating the vehicle. The driver can quickly ascertain such information while driving the vehicle, for example by viewing which of the three regions of positions the gauge 144 is currently located within, as well as determining approximately how far to the left or to the right the gauge 144 currently appears within a particular region of the display 140 at any particular point in time. Each position represents an ultimate effect of one or more actions of the driver on the fuel efficiency of the vehicle.

Figure 3:
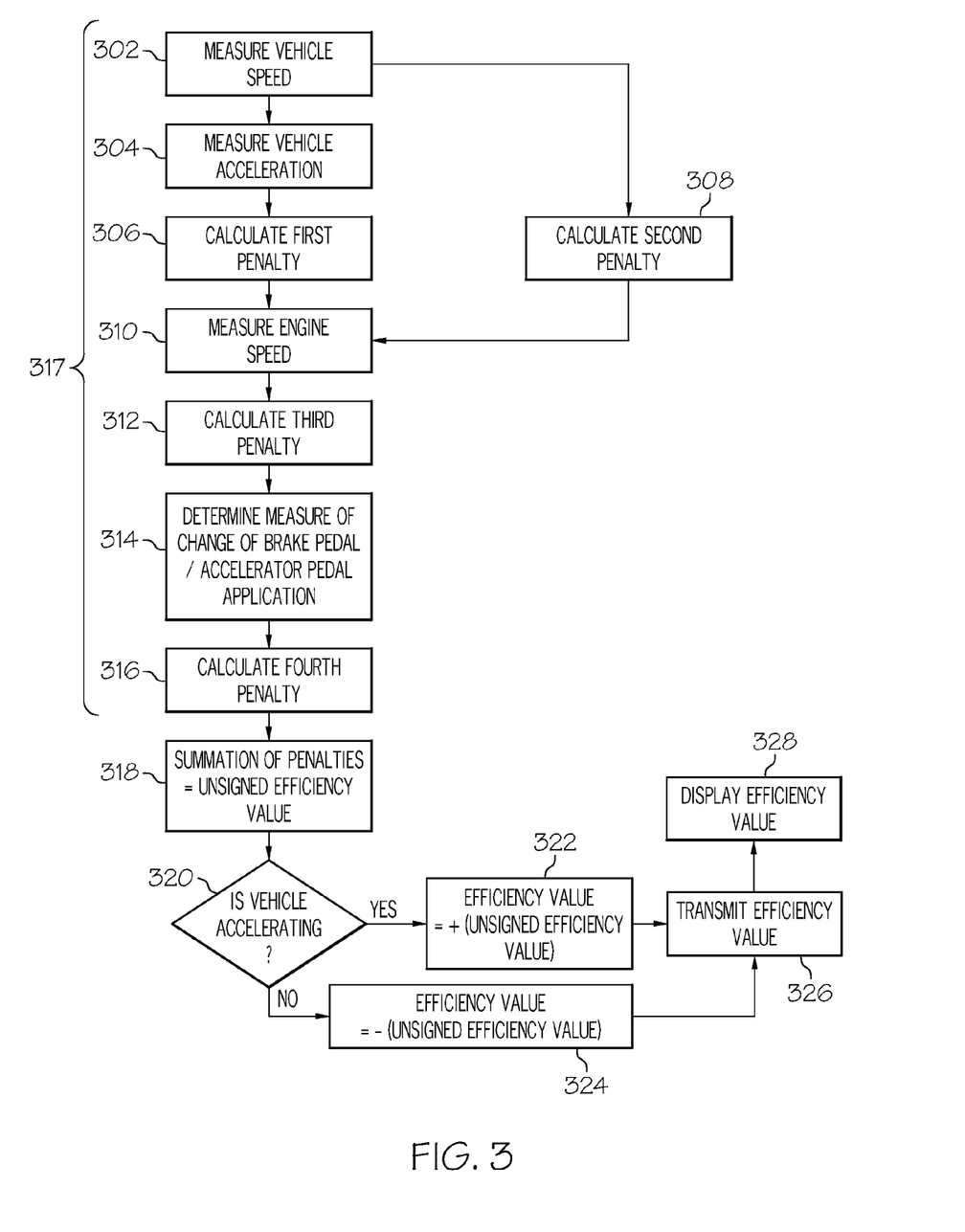
FIG. 3 is a flowchart showing a process for determining a driver efficiency value in a vehicle, and that can be used in connection with the system of FIG. 1 and the display of FIG. 2, in accordance with an exemplary embodiment of the present invention.

FIG. 3 is a flowchart of an exemplary embodiment of a driver efficiency determination and display process 300 for determining and displaying a driver efficiency value in the vehicle. As shown in FIG. 3, the driver efficiency determination and display process 300 begins with a series of steps (denoted collectively as step 317 in FIG. 3), in which various penalties are calculated, for subsequent use in determining a driver efficiency value in the vehicle. Specifically, the process begins with measuring a vehicle speed (step 302). In a preferred embodiment, the vehicle speed is determined at least in part by the vehicle speed sensor 116 of FIG. 1. In addition, a vehicle acceleration is measured (step 304). In a preferred embodiment, the vehicle acceleration is measured at least in part by the vehicle acceleration sensor 118 of FIG. 1.

A first penalty is then calculated, based on the vehicle speed and the vehicle acceleration (step 306). In one embodiment, the first penalty is calculated using the vehicle speed and vehicle acceleration values along with a known relationship correlating vehicle speed and vehicle acceleration with fuel efficiency of the vehicle. In a preferred embodiment, the first penalty represents a base score penalty that provides larger penalties for smaller accelerations as vehicle speed increases.

Figure 4:
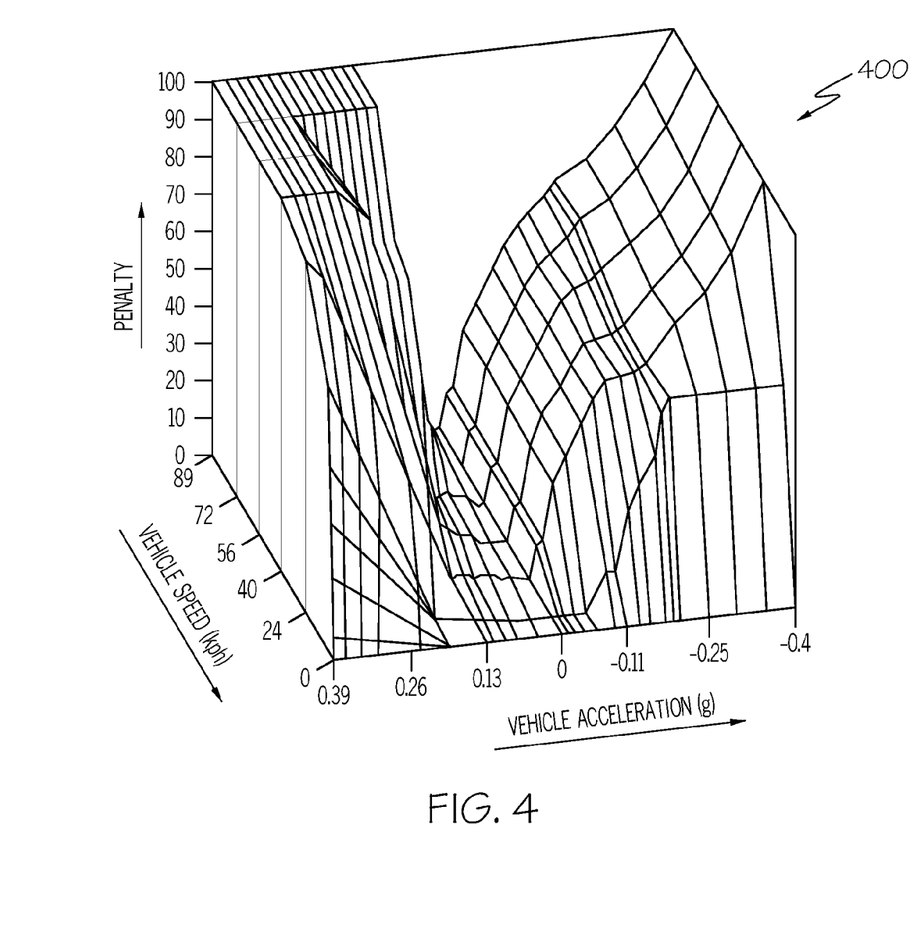
FIG. 4 is a graph showing a relationship between vehicle speed and vehicle acceleration on fuel efficiency of a vehicle, as reflected in a driver efficiency penalty, and that can be used in connection with the process of FIG. 3, in accordance with an exemplary embodiment of the present invention.

FIG. 4 depicts an exemplary embodiment of such a known relationship, in the form of a first penalty chart 400. As shown in FIG. 4, in this embodiment vehicle acceleration is represented along the x-axis and is measured in units of standard acceleration of gravity (g). Vehicle speed is represented along the y-axis and is measured in kilometers per hour (kph). The first penalty is represented along the z-axis, and is measured in units between zero and one hundred. The first penalty is thus calculated based on the combined effect of current measures of vehicle acceleration and vehicle speed on the fuel efficiency of the vehicle. While a first penalty chart 400 is shown in FIG. 4, various other different types of known relationships, such as functions of the variables or tables correlating the variables, may also be used. The first penalty chart 400, and/or any other types of known relationships 137 pertaining to these variables, are stored in the memory 128 of FIG. 1 in a preferred embodiment. Also in a preferred embodiment, the first penalty is calculated at least in part by the processor 126 of FIG. 1.

Meanwhile, and with reference again to FIG. 3, a second penalty is also calculated, based on the vehicle speed (step 308). In one embodiment, the second penalty is calculated using the vehicle speed along with a known relationship correlating vehicle speed and fuel efficiency of the vehicle. In one embodiment, the second penalty represents a greater inefficiency in response to larger amounts of aerodynamic drag as vehicle speed increases.

Figure 5:
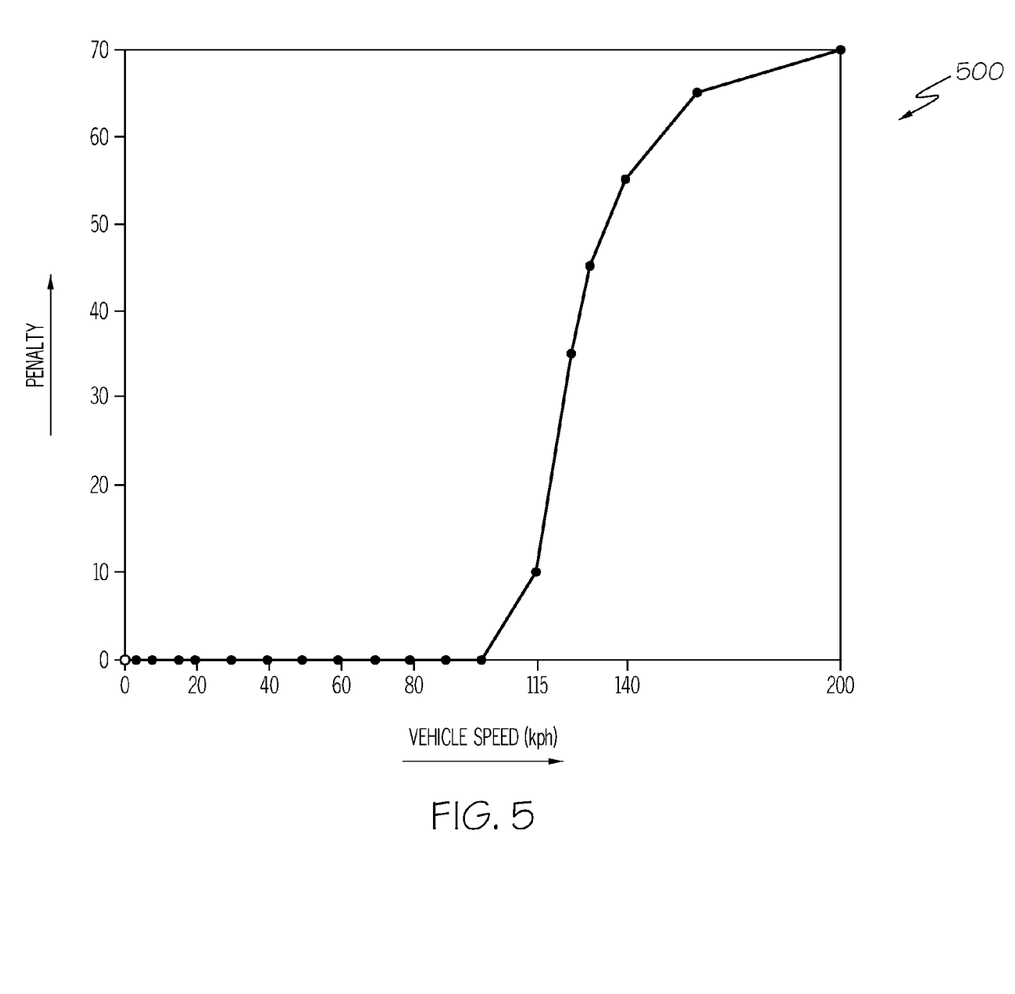
FIG. 5 is a graph showing a relationship between vehicle speed on fuel efficiency of a vehicle, as reflected in a driver efficiency penalty, and that can be used in connection with the process of FIG. 3, in accordance with an exemplary embodiment of the present invention.

FIG. 5 depicts an exemplary embodiment of such a known relationship, in the form of a second penalty chart 500. As shown in FIG. 5, in this embodiment vehicle speed is represented along the x-axis and is measured in kilometers per hour (kph). The second penalty is represented along the y-axis, and is measured in units between zero and seventy for vehicle speeds in the range of zero to two hundred kilometers per hour, as shown in FIG. 5. In other embodiments, and/or for vehicle speeds above 200 kilometers per hour, the second penalty may include higher values, for example up to a possible upper limit of one hundred in one preferred embodiment.

The second penalty is thus calculated based on the effect of current vehicle speed on the fuel efficiency of the vehicle. While a second penalty chart 500 is shown in FIG. 5, various other different types of known relationships, such as functions of the variables or tables correlating the variables, may also be used. The second penalty chart 500, and/or any other types of known relationships 137 relating these variables, are stored in the memory 128 of FIG. 1 in a preferred embodiment. Also in a preferred embodiment, the second penalty is calculated at least in part by the processor 126 of FIG. 1. It will be appreciated that, in certain embodiments, steps 306 and 308, as well as various other steps of the driver efficiency determination and display process 300, may be performed, in whole or in part, simultaneously or in an order different from that depicted in FIG. 3, regardless of the order presented in FIG. 3 or discussed herein.

Next, and with reference again to FIG. 3, an engine speed is measured (step 310). In a preferred embodiment, the engine speed is measured at least in part by the engine speed sensor 120 of FIG. 1. A third penalty is then calculated (step 312), based on the engine speed. In one embodiment, the third penalty is calculated using the engine speed along with a known relationship correlating engine speed and fuel efficiency of the vehicle. For example, in one embodiment, the third penalty may be assessed if the engine speed exceeds one thousand nine hundred revolutions per minute (1,900 rpm). Various other values and thresholds may be used in other embodiments.

Figure 6:
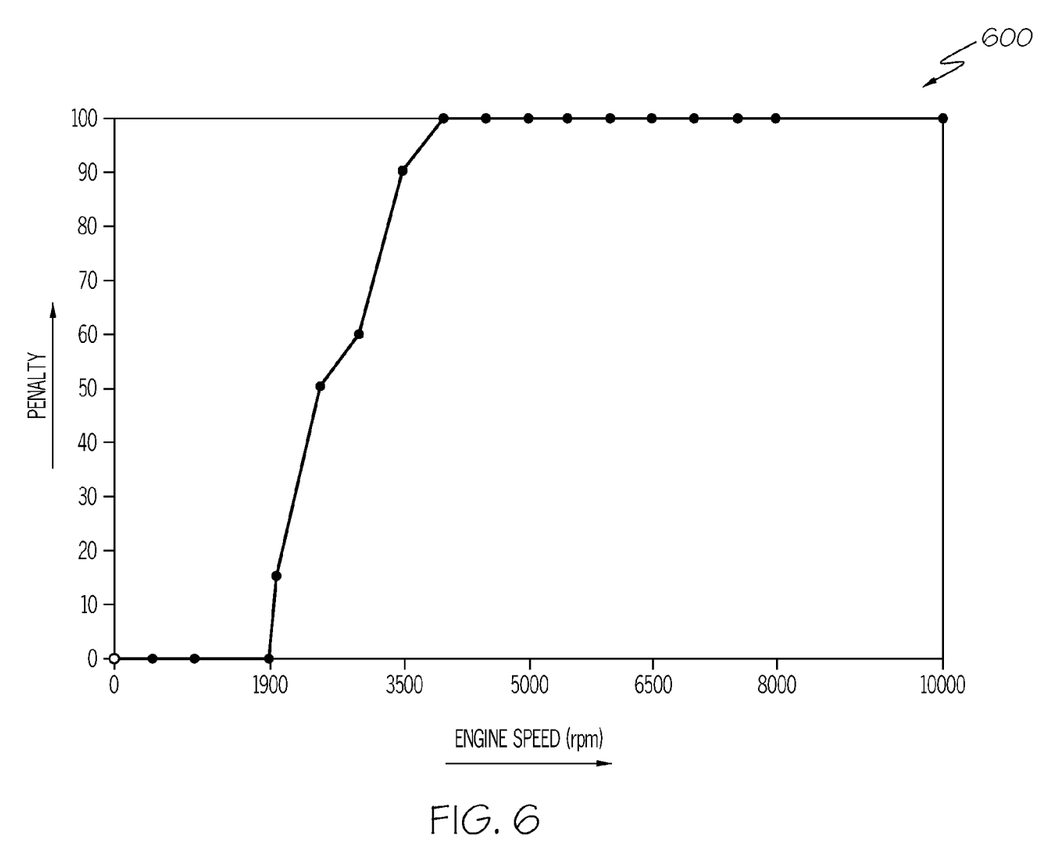
FIG. 6 is a graph showing a relationship between engine speed on fuel efficiency of a vehicle, as reflected in a driver efficiency penalty, and that can be used in connection with the process of FIG. 3, in accordance with an exemplary embodiment of the present invention.

FIG. 6 depicts an exemplary embodiment of such a known relationship, in the form of a third penalty chart 600. As shown in FIG. 6, in this embodiment, the engine speed is represented along the x-axis and is measured in revolutions per minute (rpm). The third penalty is represented along the y-axis, and is measured in units between zero and one hundred. The third penalty is thus calculated based on the effect of current engine speed on the fuel efficiency of the vehicle. While a third penalty chart 600 is shown in FIG. 6, various other different types of known relationships, such as functions of the variables or tables correlating the variables, may also be used. The third penalty chart 600, and/or any other types of known relationships 137 relating these variables, are stored in the memory 128 of FIG. 1 in a preferred embodiment. Also in a preferred embodiment, the third penalty is calculated at least in part by the processor 126 of FIG. 1.

Next, and with reference again to FIG. 3, one or more values are measured as to changes in one or more applications of an accelerator pedal or a brake pedal, or both, of a vehicle (step 314). In a preferred embodiment, these one or more values are measured with information determined by the accelerator pedal sensor 112 and/or the brake pedal sensor 114 of FIG. 1. For example, such a value may reflect jerky or "stop and go" driving maneuvers by the driver. This may include significant changes in accelerator pedal position and/or brake pedal position over a relatively short amount of time, such as when the driver (i) engages and disengages the accelerator pedal during a relatively short period of time, (ii) engages and disengages the brake pedal over a relatively short period of time, (iii) rapidly changes a magnitude of pressure applied to the accelerator pedal and/or the brake pedal over a relatively short period of time, and/or (iv) sequentially engages the accelerator pedal and the brake pedal with at least a certain amount of pressure over a relatively short amount of time. This may also include other measures of driver activity relating to changes in application of the accelerator pedal, the brake pedal, or both, thereby potentially resulting in inefficient driving.

A fourth penalty is then calculated, based on the one or more values as to changes in one or more applications of an accelerator pedal or a brake pedal, or both (step 316). In one embodiment, the fourth penalty is calculated using one or more such values along with a known relationship correlating such one or more values on the fuel efficiency of the vehicle. For example, in one embodiment, the fourth penalty represents an accelerator pedal motion penalty, and is assessed when the driver rapidly changes the accelerator pedal position.

Figure 7:
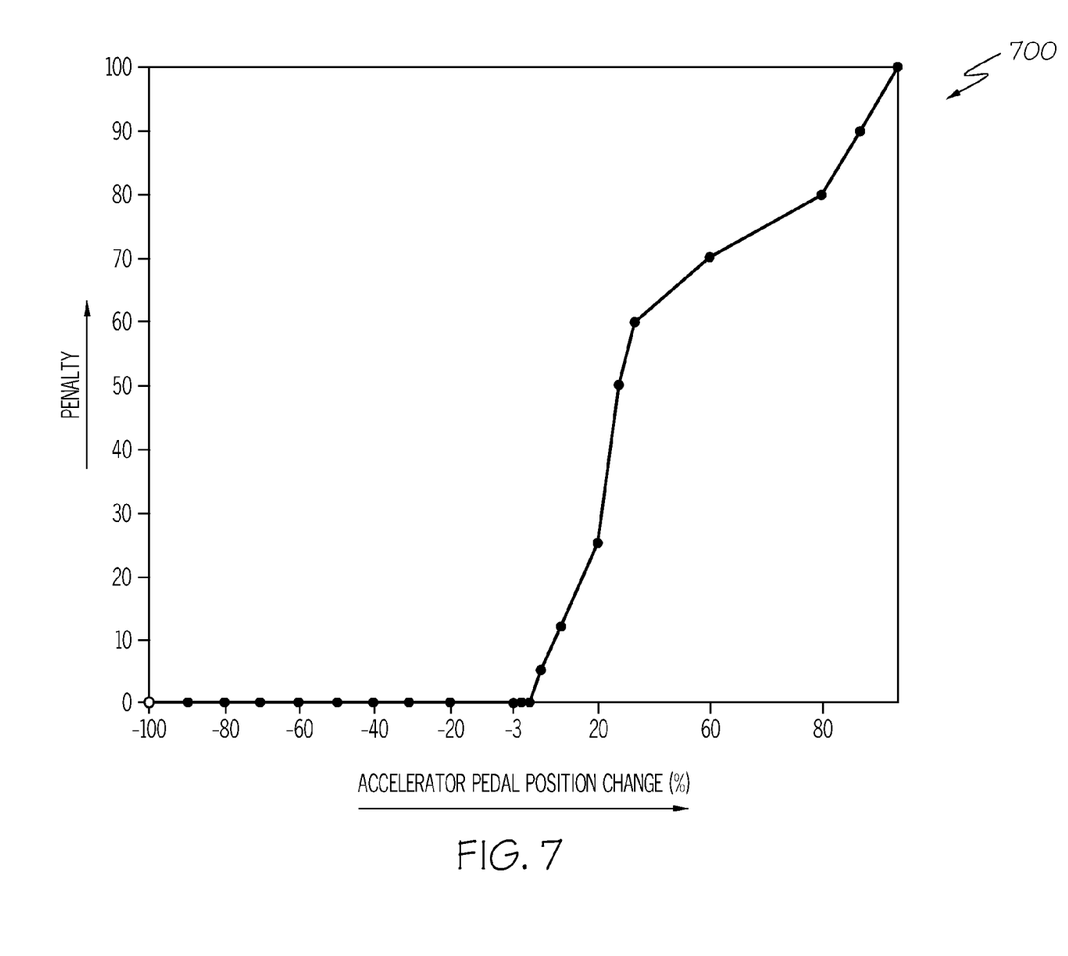
FIG. 7 is a graph showing a relationship between changes in accelerator pedal position on fuel efficiency of a vehicle, as reflected in a driver efficiency penalty, and that can be used in connection with the process of FIG. 3, in accordance with an exemplary embodiment of the present invention.

FIG. 7 depicts an exemplary embodiment of such a known relationship, in the form of a fourth penalty chart 700. As shown in FIG. 7, in one embodiment, a measure of a change in position of the accelerator pedal is represented along the x-axis and is measured as a percentage change (%). The fourth penalty is represented along the y-axis, and is measured in units between zero and one hundred. In this embodiment, the fourth penalty is thus calculated based on the effect of the percentage change in accelerator pedal position on the fuel efficiency of the vehicle.

While a fourth penalty chart 700 is shown in FIG. 7, various other different types of known relationships, such as functions of the variables or tables correlating the variables, may also be used. Additionally, the calculation of the fourth penalty may include one or more other types of measures of changes in the application of the accelerator pedal or the brake pedal, or both, such as those discussed above. The fourth penalty chart 700, and/or any other types of known relationships 137 relating these variables, are stored in the memory 128 of FIG. 1 in a preferred embodiment. Also in a preferred embodiment, the fourth penalty is calculated at least in part by the processor 126 of FIG. 1.

Returning again to FIG. 3, the first, second, third, and fourth penalties are then added together to calculate an unsigned efficiency value of the vehicle (step 318). The sign of the efficiency value will ultimately depend on whether the vehicle is accelerating or decelerating. Specifically, a determination is made as to whether the vehicle is accelerating (step 320). If it is determined that the vehicle is accelerating, then the efficiency value takes a positive sign (step 322), preferably between zero and one hundred, based on the summation value of the various penalties in step 318. Conversely, if it is determined that the vehicle is decelerating, then the efficiency value takes a negative value (step 324), preferably between zero and negative one hundred, based on the summation value of the various penalties in step 318. Alternatively stated, assuming that each of the first, second, third, and fourth penalties assume positive values, then (i) the efficiency value is equal to the summation of the penalties if the vehicle is accelerating (step 322), and (ii) the efficiency value is equal to negative one multiplied by the summation of the penalties if the vehicle is decelerating (step 324).

Next, the efficiency value is transmitted (step 326), for ultimate display for the driver. In one preferred embodiment, the efficiency value is transmitted by the processor 126 of the computer system 104 to the input device 138 of the display system 106 of FIG. 1. The efficiency value is then displayed for the driver (step 328). In one preferred embodiment, the efficiency value is displayed by the gauge 144 of the display 140 of FIGS. 1 and 2. Specifically, the efficiency value is preferably displayed by the gauge 144 of the display 140 as depicted in FIG. 2 within one of three regions, particularly the first region 242, the second region 244, or the third region 246 as depicted in FIG. 2, while the driver is operating the vehicle.

Accordingly, a system is provided for determining and displaying a driver efficiency value in the vehicle. A method is also provided for determining and displaying a driver efficiency in the vehicle. The system and method allow the driver to easily ascertain how efficiently the driver is operating the vehicle, while the driver is operating the vehicle, so that the driver can make appropriate adjustments to improve the efficiency of the driver's operation of the vehicle. Additionally, this may also help improve vehicle emissions through such driver adjustments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining driver efficiency in a vehicle, the method comprising the steps of:
    measuring a plurality of vehicle parameters that are each influenced, at least in part, by an action taken by a driver, using a sensing unit, wherein the step of measuring the plurality of penalties comprises measuring a vehicle speed and measuring a vehicle acceleration;
    determining a plurality of penalties, each penalty comprising an effect of at least one of the plurality of vehicle parameters on a fuel efficiency of the vehicle using a processor, wherein the step of determining the plurality of penalties includes calculating a first penalty, based, at least in part, on the vehicle speed, the vehicle acceleration, and a known relationship correlating vehicle speed and vehicle acceleration to fuel efficiency, such that the first penalty represents a base score penalty that provides larger penalties for smaller accelerations as vehicle speed increases; and
    aggregating the plurality of penalties together, to calculate the driver efficiency using the processor.

2. The method of claim 1, wherein the step of determining the plurality of penalties further comprises the step of:
    calculating a second penalty, based, at least in part, on the vehicle speed and a known relationship correlating vehicle speed to fuel efficiency.

3. The method of claim 2, wherein the step of determining the plurality of penalties further comprises the steps of:
    measuring an engine speed; and
    calculating a third penalty, based, at least in part, on the engine speed and a known relationship correlating engine speed to fuel efficiency.

4. The method of claim 3, wherein the step of determining the plurality of penalties further comprises the steps of:
    determining a measure of change in application of a brake pedal, an accelerator pedal, or both; and
    calculating a fourth penalty, based, at least in part, on the measure of change and a known relationship correlating such measure of change to fuel efficiency.

5. The method of claim 4, further comprising the steps of:
    determining whether the vehicle is accelerating or decelerating;
    assigning the driver efficiency a positive value, if the vehicle is accelerating; and
    assigning the driver efficiency a negative value, if the vehicle is decelerating.

6. The method of claim 4, wherein the step of aggregating the plurality of penalties together comprises the step of:
    aggregating the first penalty, the second penalty, the third penalty, and the fourth penalty together, to calculate the driver efficiency.

7. The method of claim 1, further comprising the steps of:
    determining whether the vehicle is accelerating or decelerating;
    assigning the driver efficiency a positive value, if the vehicle is accelerating; and
    assigning the driver efficiency a negative value, if the vehicle is decelerating.

8. A system for displaying driver efficiency for a vehicle, the system comprising:
    a sensing unit configured to at least facilitate measuring a plurality of vehicle parameters that are each influenced, at least in part, by an action taken by a driver;

a processor coupled to the sensing unit and configured to at least facilitate:
　determining a plurality of penalties, each penalty comprising an effect of at least one of the plurality of vehicle parameters on a fuel efficiency of the vehicle; and
　aggregating the plurality of penalties together, to calculate the driver efficiency; and
a gauge that is movable between and within:
　a first range of positions, indicating that the driver efficiency is in an ideal range;
　a second range of positions, indicating that:
　　the driver efficiency is in not in the ideal range; and
　　the vehicle is decelerating; and
　a third range of positions, indicating that:
　　the driver efficiency is in not in the ideal range; and
　　the vehicle is accelerating.

9. A display device for a vehicle, the display device comprising:
　an input device configured to receive a driver efficiency, the driver efficiency comprising a measure of an impact of an action taken by a driver of the vehicle on a fuel efficiency of the vehicle; and
　a display coupled to the input device, the display comprising a gauge configured to move between and within:
　　a first range of positions, indicating that the driver efficiency is in an ideal range;
　　a second range of positions, indicating that:
　　　the driver efficiency is in not in the ideal range; and
　　　the vehicle is decelerating; and
　　a third range of positions, indicating that:
　　　the driver efficiency is in not in the ideal range; and
　　　the vehicle is accelerating.

10. A method for determining driver efficiency in a vehicle, the method comprising the steps of:
　measuring a plurality of vehicle parameters that are each influenced, at least in part, by an action taken by a driver, using a sensing unit;
　determining a plurality of penalties, each penalty comprising an effect of at least one of the plurality of vehicle parameters on a fuel efficiency of the vehicle using a processor;
　aggregating the plurality of penalties together, to calculate the driver efficiency using the processor;
　determining whether the vehicle is accelerating or decelerating;
　assigning the driver efficiency a positive value, if the vehicle is accelerating; and
　assigning the driver efficiency a negative value, if the vehicle is decelerating.

11. A system for displaying driver efficiency for a vehicle, the system comprising:
　a sensing unit configured to at least facilitate measuring a plurality of vehicle parameters that are each influenced, at least in part, by an action taken by a driver; and
　a processor coupled to the sensing unit and configured to at least facilitate:
　　determining a plurality of penalties, each penalty comprising an effect of at least one of the plurality of vehicle parameters on a fuel efficiency of the vehicle;
　　aggregating the plurality of penalties together, to calculate the driver efficiency;
　　determining whether the vehicle is accelerating or decelerating;
　　assigning the driver efficiency a positive value, if the vehicle is accelerating; and
　　assigning the driver efficiency a negative value, if the vehicle is decelerating.

12. The system of claim 11, wherein:
the sensing unit is configured to at least facilitate:
　measuring a vehicle speed; and
　measuring a vehicle acceleration; and
the processor is configured to at least facilitate:
　calculating a first penalty, based, at least in part, on the vehicle speed, the vehicle acceleration, and a known relationship correlating vehicle speed and vehicle acceleration to fuel efficiency.

13. The system of claim 12, wherein:
the processor is further configured to at least facilitate calculating a second penalty, based, at least in part, on the vehicle speed and a known relationship correlating vehicle speed to fuel efficiency.

14. The system of claim 13, wherein:
the sensing unit is further configured to at least facilitate measuring an engine speed; and
the processor is further configured to at least facilitate calculating a third penalty, based, at least in part, on the engine speed and a known relationship correlating engine speed to fuel efficiency.

15. The system of claim 14, wherein:
the sensing unit is configured to at least facilitate determining a measure of change in application of a brake pedal, an accelerator pedal, or both; and
the processor is configured to at least facilitate calculating a fourth penalty, based, at least in part, on the measure of change and a known relationship correlating such measure of change to fuel efficiency.

16. The system of claim 15, wherein the processor is further configured to aggregate the first penalty, the second penalty, the third penalty, and the fourth penalty together, to calculate the driver efficiency.

17. The system of claim 11, further comprising:
a gauge that is movable between and within:
　a first range of positions, indicating that the driver efficiency is in an ideal range;
　a second range of positions, indicating that:
　　the driver efficiency is in not in the ideal range; and
　　the vehicle is decelerating; and
　a third range of positions, indicating that:
　　the driver efficiency is in not in the ideal range; and
　　the vehicle is accelerating.

18. The system of claim 11, further comprising:
a memory configured to store a known relationship correlating the vehicle parameter or one of a plurality of additional vehicle parameters, or both, to the fuel efficiency of the vehicle.

* * * * *